Patented Nov. 13, 1923.

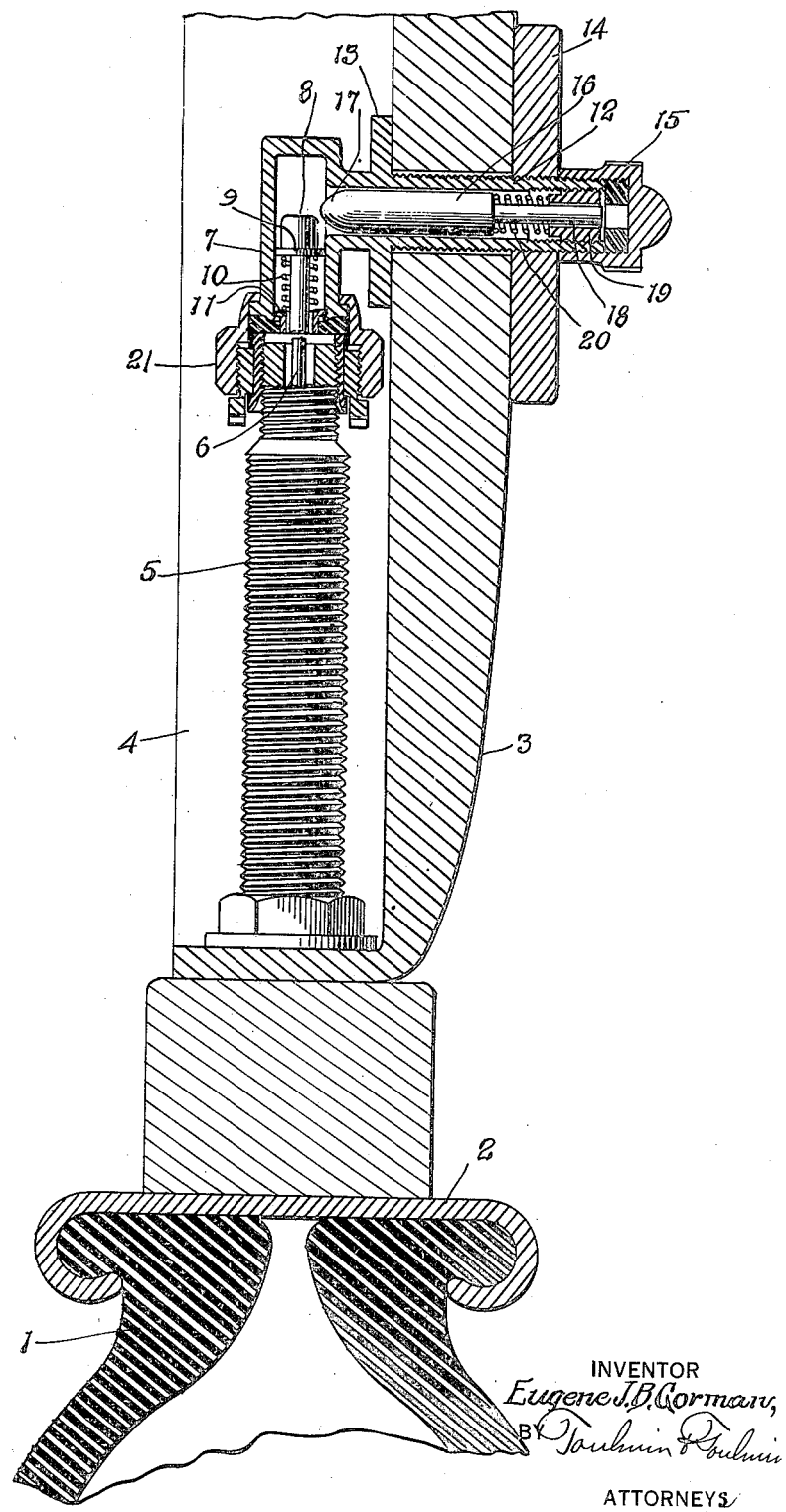

1,473,621

UNITED STATES PATENT OFFICE.

EUGENE J. B. GORMAN, OF DAYTON, OHIO.

VALVE.

Application filed September 25, 1920. Serial No. 412,844.

*To all whom it may concern:*

Be it known that I, EUGENE J. B. GORMAN, a citizen of the United States, residing at Dayton, in the county of Montgomery and State of Ohio, have invented certain new and useful Improvements in Valves, of which the following is a specification, reference being had therein to the accompanying drawing.

My invention relates to valves, and in particular to valves used in connection with automobile tires and inner tubes.

The object of my invention is to provide a valve which may be actuated from the side thereof. It is a matter of great convenience to attach an air hose or otherwise actuate the valve member in the valve at the side of it rather than on the top directly over the valve member.

This is especially true in the case of the modern disk wheel. It is frequently desired to get at the valve on a disk wheel and it is always located on the inside of the disk in order to enhance the appearance of the disk wheel.

It is my object to provide such a valve readily detachable from the disk wheel, which will not rattle and which will enable the user to positively actuate the valve member in the tire valve from the outside of the wheel. All that will show on the outside of the wheel will be a neat and decorative cap.

Referring to the accompanying drawings: the figure is a side elevation of a vertical section of the wheel, rim and valve mechanism.

1 refers to the tire, 2 the rim, 3 the disk wheel which is chambered at 4 to permit of the insertion of the valve stem 5. The valve stem 5 contains the usual valve member or plunger 6. This valve 5 is capped by a cap 7 which contains a cap member 8 having an annular projection or shoulder 9. A spring 10 abuts against one end of this shoulder, having its other end resting upon a seat 11 of the cap. This cap has a lateral right-angled projection, being extended through the wheel 3, as at 12. There is a stop plate 13 and a locking plate 14, between which the wheel 3 is embraced, and the result of which is that the valve mechanism is securely locked in its relation to the wheel. The usual cap 15 is placed upon the end of the extension 12 when the vehicle is in motion or when it is not desired to actuate the valve mechanism.

When it is so desired to actuate the valve mechanism in order to inflate the tire, deflate it or otherwise adjust it, there is provided a plunger 16 having a rounded head 17 which is adapted to engage with the shoulder 9 on the cap member 8. This member 16 has one end reduced in diameter, as at 18, which passes through the guide 19 screwed into 12. Between this guide and the shoulder 20 on the member 16 is placed a spring which determines the approximate position of 16 when not in operation and which serves to return it to its normal position after having been actuated in a left-hand direction.

The result of actuating 16 in a left-hand direction is to bring its rounded head 17 into contact with the shoulder 9, thus depressing the cap member 8 which, in turn, will depress the valve member 6. The result of this is to allow the free passage of air into or out of the valve 5.

In case it is desired to remove the entire rim, tire and valve with its valve member the connecting member 21 is unscrewed with its companion parts from the valve member 5. The exact construction of such mechanism is not essential. This would leave affixed to the wheel permanently the valve actuating mechanism and allow the valve member and valve to be removed with the rim and tire as usual.

It will therefore be readily seen that my invention easily adapts itself to existing standard constructions of wheel, valve and valve member, as well as rim, without modification of any of the cooperating parts.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. In combination, a valve, a valve member, a wheel, a cap over said valve, a cap member therein adjustable to make contact with said valve member, a plunger adapted to actuate said cap member and valve member by manipulation of the plunger from the other side of the wheel, whereby the valve member may be actuated from the other side of the wheel to permit of the passage of air in the valve.

2. In combination, a valve, a valve member, a wheel, a cap on said valve, a cap member moving therein, a shoulder on said cap member, an extension of said cap at right angles thereto through said wheel, means on said cap to affix it to said wheel, a plunger moving in the extension of said cap adapted to make contact with the shoulder and actuate the cap member, whereby the valve member may be actuated and air may be permitted to pass to and from the valve.

3. In combination, a valve, a valve member, a cap, means for detachably securing said cap to said valve, a cap member movable in the cap, means for normally maintaining said cap member out of engagement with the valve member, a shoulder on said cap member, an extension at right angles to said cap member as a part thereof through said wheel, means on said extension for preventing the movement of said cap member in one direction relative to said wheel, adjustable means on said cap member for clamping said wheel between the last-mentioned means and the adjustable means, a plunger with a conical head adapted to make contact with the shoulder on said cap member, means for maintaining said plunger in the extension of the cap member in a normal position, whereby when the plunger is actuated the cap member and valve member will be actuated to permit the passage of air to and from the valve.

4. In a valve for tires or the like, a fitting having means for detachable connection to the valve, and having a part in line with the valve and a part at an angle thereto, members in said fitting, the one moving in line with the valve pin and the other moving at an angle thereto and adapted to move the first, and said second named part having a portion arranged at the outer end of the fitting for engagement with a gauge or the like.

5. In a valve for tires or the like, a fitting having means for detachable connection to the valve, and having a part in line with the valve and a part at an angle thereto, members in said fitting, the one moving in line with the valve pin and the other moving at an angle thereto and adapted to move the first, and said second named part having a portion arranged at the outer end of the fitting for engagement with a gauge or the like, and a spring for normally holding the first named member in its upper position.

6. In a valve for tires or the like, a fitting having means for detachable connection to the tire valve, a packing washer adapted to make a tight joint with the tire valve, a pin member having a guide abutting against said packing washer, a spring normally holding said pin member in its uppermost position, said pin member being adapted when depressed to open the valve, a second pin member moving at an angle with the first and having a part adjacent to the end of the fitting for engagement with a gauge or the like, and the pin members having a wedging connection at their adjacent ends whereby a movement of the second member is transmitted to the first.

In testimony whereof I affix my signature.

EUGENE J. B. GORMAN.